S. SPOOR.

Improvement in Base-Burning Stoves for Heating and Cooking.

No. 5,074. Reissued Sep. 24, 1872.

Witnesses,

E. C. Middleton

Geo Bartle

Inventor,

Stephen Spoor, by his attorney,

J. S. Brown.

AM. PHOTO-LITHOGRAPHIC CO. N.Y. (OSBORNE'S PROCESS.)

UNITED STATES PATENT OFFICE.

STEPHEN SPOOR, OF TROY, NEW YORK, ASSIGNOR OF PART INTERESTS TO HELEN M. SPOOR AND WILLIAM M. SPOOR.

IMPROVEMENT IN BASE-BURNING STOVES FOR HEATING AND COOKING.

Specification forming part of Letters Patent No. 111,485, dated January 31, 1871; reissue No. 5,074, dated September 24, 1872.

*To all whom it may concern:*

Be it known that I, STEPHEN SPOOR, of Troy, in the county of Rensselaer and State of New York, have invented Improvements in Base-Burning Heating-Stoves; and I do hereby declare that the following is a full and exact description thereof, reference being had to the accompanying drawing making part of this specification—

Figure 1:
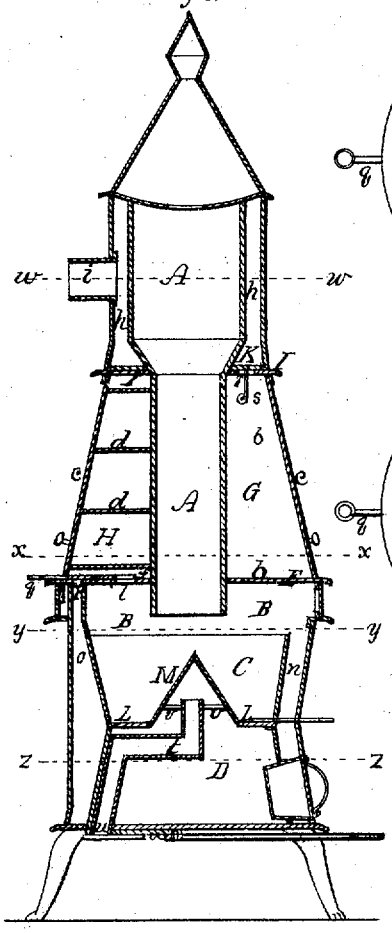
Figure 4:
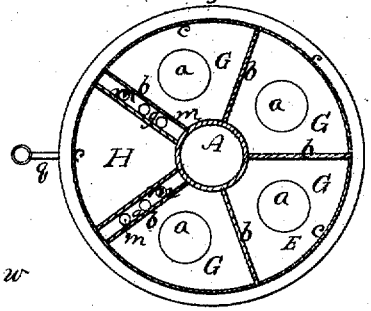
Figure 5:
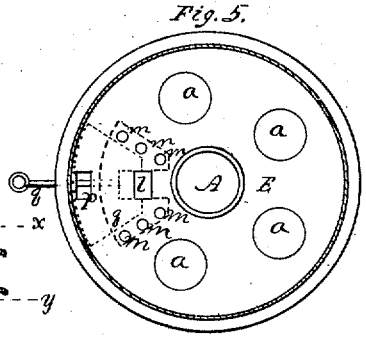
Figure 3:
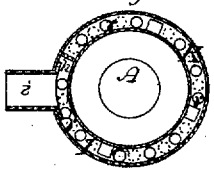
Figure 8:
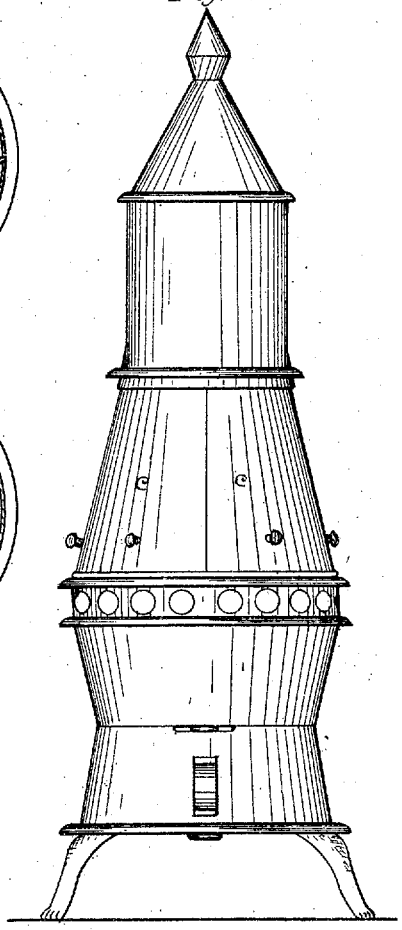
Figure 2:
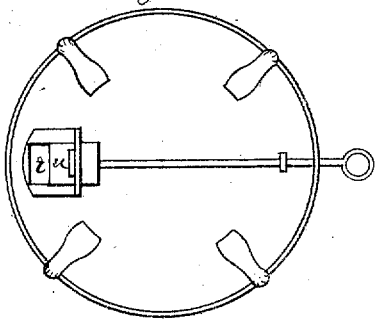
Figure 7:
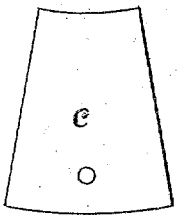
Figure 6:
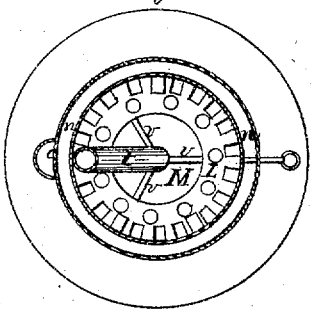

Figure 1 being a central vertical section of a base-burning heating-stove provided with my improvements; Fig. 2, a view of the bottom thereof; Fig. 3, a horizontal section of the same in a plane indicated by the line *w w*, Fig. 1, looking downward; Fig. 4, a horizontal section in a plane indicated by the line *x x*, Fig. 1, looking downward; Fig. 5, a horizontal section in a plane indicated by the line *y y*, Fig. 1, looking upward; Fig. 6, a horizontal section in a plane indicated by the line *z z*, Fig. 1, looking upward; Fig. 7, a front view of a part detached; and Fig. 8, a front elevation of the stove.

Like letters designate corresponding parts in all of the figures.

Let A represent the magazine or reservoir, B the combustion-chamber, C the fire-pot, and D the ash-chamber, of a base-burning heating-stove. Around or outward from the lower part of the magazine A, and immediately over the combustion-chamber B, is a plate, E, covering the diameter of the stove at that height, and provided with holes *a a* for admitting boilers and other cooking or heating utensils, as in a cooking-stove. Above this plate E are cooking-spaces G G, which are separated one from another by vertical radial partitions *b b*, and closed in by removable covers *c c*, as shown, or by doors arranged in any suitable manner. These covers or doors conform with the outer contour of the stove, and together, when closed in place, form, in whole or in part, the outer case of that part of the stove, concealing all of the cooking arrangements inside; but, when cooking, one or more of these covers or doors may be removed or opened. The spaces G G may serve as well for small ovens as for mere cooking-recesses; but one space, at least—the rear one H, as shown in the drawing—is or may be constructed and arranged especially for an oven, being provided with shelves or grates *d d*, like ordinary cooking-stove ovens. Beneath this oven, as represented, there is no boiler-hole; but there is under it a flue, *f*, and at its sides, by the adjacent partitions *b b*, there are vertical flues *g g*, which extend upward and conduct the products of combustion from the combustion-chamber into an annular or heat-circulating space, *h*, around the magazine A above the cooking spaces or ovens G G and H, from which heat-circulating space the draft has or may have an exit into the smoke-pipe at *i*. Thus the oven H has at all times a continual circulation of heat around it sufficient to make it effective for baking whenever there is any considerable combustion going on in the stove. The passage of the draft from the combustion-chamber B into the upwardly-conducting flues *f g g* may be either direct or indirect—direct through a valve-aperture, *l*, into the flue *f*, and through apertures *m m* into the side flues *g g*, all of these apertures being through the division-plate E; and indirect, first, downward into an annular space, *n*, around the fire-pot C, thence into the ash-chamber D, and therefrom into the lower part of a flue or passage, *o*, at the back of the stove, and upward therein into the flue *f'*, through an aperture, *p*, in the plate E. The apertures *m m* might be dispensed with. The draft may be allowed to pass directly through the valve-apertures *l m m*, when desired, as when kindling a fire, or when the fire gets low in the stove. At other times the draft may pass down through the space *n* into the base of the stove, thereby conveying and radiating the heat close down to the floor, and increasing the heating-surface of the stove. The exit of the draft either way is determined and regulated by a sliding valve or damper, *q*, which is pushed inward to close the apertures *l m m* and open the aperture *p*, as shown by heavy dotted lines in Fig. 5, and is drawn outward to open the apertures *l m m* and close the aperture *p*, as shown by light dotted lines in the same figure and as seen in Fig. 1. The spaces or ovens G G H are separated from the annular or heat-circulating space *h* above them by a horizontal plate, I, which has or may have perforations through it, as shown at *r r*, Figs. 1 and 3, to be opened or closed by a register or valve plate, K, with corresponding holes therein. The object of these holes and valve is to carry off any smoke, steam, or odors from the cooking spaces or ovens into the draft-space above, when desired, and to gain access to the space *h* for clearing out accumulated soot and ashes therefrom. The valve-plate K may be moved and adjusted in position by means of a handle, *s*, Fig. 1, projecting down into one of the recesses G G, or by equivalent means. The wall or case of the magazine A also forms the back plate or wall of the cooking spaces or ovens G G and H, so that the heat of the magazine radiates immediately into said spaces or ovens without any intermediate space, increasing the heating power thereof, applying the heat more evenly therein, and utilizing all the room around the magazine, so as to obtain the greatest size of ovens possible with a given diameter of stoves. The magazine A may be enlarged above the said cooking spaces, recesses, or ovens, as shown, so as to give it as much capacity as possible, and yet make it as small as desired between the ovens. The fire-pot C is or may be provided with an annular grate, L, at the bottom, with a central open space in the same, to be covered by a close cone, M, as shown, if desired. In connection with this cone, the draft air is introduced into the ash-chamber D through a pipe or close passage, *t*, the inner end of which extends centrally, or nearly so, up into the hollow of the cone, as shown in Fig. 1. The air is thereby caused to impinge against the lower surface of the cone, to prevent the same from becoming too hot and burning rapidly away, and also to heat the draft air for improving the combustion of the coal. The admission of air into the pipe *t* may be regulated by a sliding valve, *u*, under the bottom of the stove, as represented in Figs. 1 and 2. The cone M may be supported by the pipe *t* by means of connecting-arms *v v*, Figs. 1 and 6. The grate L vibrates around the cone when shaken. The partition-plates *b b*, between the cooking spaces or ovens G G, serve also to support the upper part of the stove, and, together with the covers or doors *c c*, give the proper exterior form to that part of the stove. The number of cooking spaces or ovens G G may vary, according to convenience or preference. The plate or floor E is generally extended outward beyond the case of the stove, and serves to support the covers *c c*.

What I claim as my invention, and desire to secure by Letters Patent, is—

1. In a base-burning stove, a plate, E, situated above the combustion-chamber and covering the same around or outside of the magazine, in combination with one or more ovens or inclosed cooking-spaces above it, substantially as specified.

2. In a base-burning stove, one or more ovens or inclosed cooking-spaces situated between a division plate or floor underneath, covering the combustion-chamber, around or outside of magazine, and a heat-circulating space above in the top of the stove, substantially as specified.

3. In a base-burning stove, one or more ovens or inclosed cooking-spaces situated around or at the side of the magazine, when the wall or case of the magazine forms the back plate or wall of the said ovens or cooking-spaces, or a division-plate between the same without any intermediate space, substantially as specified.

4. The partition-plate E, when extended outward beyond the casing of the stove, and supporting the inclosing-covers *c c*, as specified.

5. The ovens or inclosed cooking-spaces G G H, situated around or by the side of the magazine A of a base-burning stove, in combination with a plate or floor, E, situated beneath the same, over the combustion-chamber, and provided with boiler or cooking holes *a a*, substantially as specified.

6. The inclosing covers or doors *c c*, when arranged in combination with the outer wall or case of the stove, so as to conform with its contour and conceal the appearance of cooking-spaces within, substantially as specified.

7. The arrangement and combination of the valve-apertures *l m m*, leading directly to the flues *f g g*, and the annular diving-flue space *n*, pipe or flue *o*, and valve-aperture *p*, leading indirectly to said flues, in combination with a regulating damper or valve, *q*, substantially as and for the purposes specified.

8. The perforated plate I and valve or register plate K, arranged between the ovens or cooking-spaces G G and the flue-space *h* above the same, substantially as and for the purpose herein specified.

STEPHEN SPOOR.

Witnesses:
J. S. BROWN,
E. C. MIDDLETON.